United States Patent [19]

Pippard

[11] 4,405,493
[45] Sep. 20, 1983

[54] CORROSION INHIBITORS, METHOD OF PRODUCING THEM AND PROTECTIVE COATINGS CONTAINING THEM

[75] Inventor: David A. Pippard, Hampton Hill, England

[73] Assignee: The British Petroleum Company Limited, London, England

[21] Appl. No.: 112,349

[22] Filed: Jan. 15, 1980

[30] Foreign Application Priority Data

Feb. 3, 1979 [GB] United Kingdom ............... 793860

[51] Int. Cl.$^3$ .................. C09D 5/08; C23F 11/18
[52] U.S. Cl. ............................ 252/389 A; 106/14.39;
106/14.44; 252/387; 252/389 R; 422/6; 422/8;
422/12; 422/18
[58] Field of Search ............... 252/389 A, 389 R, 387;
106/14.39, 14.44; 422/6, 8, 12, 18

[56] References Cited

U.S. PATENT DOCUMENTS

| | | | |
|---|---|---|---|
| 3,899,624 | 8/1975 | Sutherland | 428/327 |
| 3,996,058 | 12/1976 | Warp | 252/387 |
| 4,210,575 | 7/1980 | Drake | 106/14.44 |

FOREIGN PATENT DOCUMENTS 720287 12/1954 United Kingdom .
1044350 9/1966 United Kingdom .
1503153 3/1978 United Kingdom .

*Primary Examiner*—Irwin Gluck
*Attorney, Agent, or Firm*—Morgan, Finnegan, Pine, Foley & Lee

[57] ABSTRACT

Corrosion inhibiting particles comprise an inorganic oxide, particularly alumina, having corrosion inhibiting anions, particularly phosphate, chromate or benzoate anions, chemically bound to them. They may be prepared by contacting an oxide containing hydroxyl groups with an acidic solution containing the anions at ambient temperatures. The particles may be incorporated into protective coatings, e.g. paints based on epoxy resins, alkyd resins or chlorinated rubbers, in amounts up to 80% wt based on dry film weight, giving coatings with up to 4.0% corrosion inhibiting anions. Release of the anions is by ion-exchange with other anions e.g. the chloride anions of sea water or salt spray, and does not, as is normal with corrosion inhibiting coatings, depend on water solubility.

8 Claims, No Drawings

CORROSION INHIBITORS, METHOD OF PRODUCING THEM AND PROTECTIVE COATINGS CONTAINING THEM

This invention relates to corrosion inhibitors suitable for incorporation into protective coatings, e.g. paints.

It is well known that certain anions, e.g. phosphate, chromate and benzoate anions have corrosion inhibiting properties and that compounds containing such species can be included in protective coatings. The compounds are usually in the form of sparingly water-soluble salts. The coatings themselves have a limited permeability to water and it is believed that the mechanism of corrosion inhibition involves the gradual dissolving of the compounds in water releasing the anions as the active inhibitors. For such systems to be effective over a long period the solubility of the compound is particularly important. If the compound if too soluble, blistering of the coating may occur and the compound will be rapidly depleted; if it is insufficiently soluble the compound will be ineffective.

The present invention is concerned with corrosion inhibitors which depend for their effectiveness on ion exchange rather than solubility.

According to the present invention, a corrosion inhibitor comprises particles of an inorganic oxide having corrosion inhibiting anions chemically bound to the particles.

The preferred corrosion inhibiting anions are those mentioned above, i.e. phosphate, chromate and benzoate anions but other known corrosion inhibiting anions may also be used provided, as discussed hereafter, they are stable in acid media.

The preferred inorganic oxide is alumina. Other oxides which may be suitable include zirconia, iron oxides ($Fe_2O_3$ and $Fe_3O_4$), and tin oxide. Mixed metal oxides may also be suitable as may naturally occurring clays such as kaolinite. As is well known, particles of alumina and other oxides may be prepared which have a proportion of hydroxyl groups on their surface, e.g. the so-called activated aluminas of commerce used, inter alia, as packing for chromatographic columns.

It has been found that the hydroxyl groups can be replaced by contacting the oxide (e.g. alumina) with an acidic solution containing phosphate, chromate or benzoate anions. The uptake of anions tends to increase as the pH is decreased below pH 7, and at a relatively low pH, (e.g. a pH of from 2 to 5), uptake will occur at ambient temperature relatively quickly (contact time of, for example, up to 5 hours). Elevated temperatures are not damaging, however, and may be used if required, e.g. with benzoic acid to increase its solubility in water. The uptake of anions on the oxide can be measured by standard analytical technicals, e.g. X-ray fluoresence for phosphate or chromate anions, and carbon analysis for benzoate anions. The minimum uptake will depend on the proportion of replaceable hydroxyl groups and, clearly, oxides with a high proportion of such groups are preferred. Examples of suitable aluminas are the commercially available activated aluminas sold under the name "Camag" and defined as having a Brockman Activity I for chromatography, and F1 aluminas sold by the Aluminum Company of America.

Depending on the proportion of hydroxyl groups on the inorganic oxide it has been found that up to 5% wt of anion can be combined with the oxide (i.e. up to 0.7 millimols/g). Since, as indicated above, the technique of ion-exchange is relatively simple the selection of preferred inorganic oxides and the treatments to give maximum uptake of corrosion inhibiting anions can be determined by simple comparative experiments. The preferred lower limit is 1% wt.

The corrosion inhibiting particles may be included in protective coatings and the present invention includes protective coatings containing corrosion inhibiting particles as described above. The protective coating may be any of the known types of protective coatings based on film forming polymers or resins, e.g. paints, varnishes and lacquers. It may, in particular, be primer paints based on epoxy resins, vinyl resins, alkyd resins or chlorinated rubbers.

The corrosion inhibiting particles may act as a filler for the coating and may be included in relatively large amount of up to 40% wt, based on the composition to be applied and up to 80% wt based on the dry film weight.

Having regard to the quantity of anions which can be combined with the oxide as discussed previously it will be seen that the coatings may contain up to 4% wt of corrosion-inhibiting anions based on the dry film weight.

Preferably the quantity of corrosion-inhibiting anions is at the upper end of the range, preferred amounts of particles being 30–80% wt based on the dry film weight giving from 1.5 up to 4.0% wt of corrosion inhibiting anions.

When used in protective coatings the particles should be suitably small so as to remain in suspension in the composition before application and so as not to substantially affect the ease of application or the smoothness of the dry coating. Suitable particles sizes may be up to 100 micron diameter.

The corrosion inhibiting particles act to release the anion into solution by ion exchange with an anion which exists in the environment in which the particles are used. Thus the invention is particularly useful for protecting structures in or above the sea, the sea providing chloride anions for exchange with the corrosion inhibiting anions. The structures will normally be metal structures and the corrosion inhibiting particles will normally be in a protective coating. Unlike present paints which act by the solubilisation of corrosion inhibiting salts, it is the permeability to the exchanging anions rather than the permeability of water which controls the rate of release of the corrosion inhibiting ions. Thus the corrosion inhibiting anions will be preferentially released from the alumina in those areas where the desired barrier properties of the coating are weakest.

Particular structures which may be protected are the hulls and superstructures of ships, and rigs and platforms used for oil or gas exploration or production.

The invention may, however, have application for protecting structures on land where potentially corrosive anions may be present in the atmosphere, e.g. structures subject to atmospheres with relatively high concentrations of $SO_2$, $SO_3$ or $Cl^-$.

In addition to control of the release of the corrosion inhibiting anions by control of the ion permeability of the protective coating, control may also be exercised by the type of anion and the type of oxide.

Thus, in otherwise identical conditions, it has been found that phosphate anions are released less easily than chromate anions which, in their turn, are released less easily then benzoate anions. There may also be differences in the rate of release as between different types of alumina.

The invention is illustrated by the following examples.

EXAMPLE 1

Preparation of ion-exchanged aluminas

The aluminas used were activated aluminas sold under the designations F1 by the Aluminium Company of America and "CAMAG" M.F.C. Brockman Activity 1 (Neutral) by Hopkin and Williams. The same treatment was given to both aluminas. The F1 alumina was in the form of 14–28 mesh granules and the "CAMAG" alumina was also in similar granular form. Chromate, phosphate and benzoate anions were combined with the aluminas as follows:

1. 500 g of the activated alumina were treated with 1 liter of an aqueous solution of 40 g $K_2CrO_4$ at 25° C. Concentrated nitric acid (approximately 40 ml) was added to give a pH of 3.5 after 2 hours stirring. The alumina was then separated on a sieve and washed thoroughly with distilled water.
2. 500 g of the activated alumina were treated with 1 liter of water and approximately 50 ml orthophosphoric acid (90%) and 25° C. to give a pH of 3.2 after 3 hours stirring. The alumina was then separated on a sieve and washed thoroughly with distilled water.
3. 500 g of the activated alumina were treated with 1 liter of a 70:30 water:isopropanol solution containing 42 g benzoic acid for 2 hours at 25° C. The alumina was then separated on a sieve and washed thoroughly, first with 70:30 water:isopropanol and finally with distilled water.
4. The alumina used as a control was simply washed thoroughly with distilled water.

The amounts of anion incorporated by these treatments were 0.3 mmole/g chromate, 0.7 mmole/g phosphate and 0.4 mmole/g benzoate for the F1 alumina. For the "CAMAG" alumina the figures were 0.2 mmole/g chromate and 0.6 mmole/g phosphate. The benzoate anion content was not measured but was predicted to be 0.3 mmole/g.

EXAMPLE 2

Preparation and testing of paints

The chromate exchanged "CAMAG" alumina of Example 1, which had a maximum particle size of 100 micron (after dry grinding in a porcelain ball mill for 9 hours), was incorporated into a paint by ball milling for 15 minutes. Untreated alumina was also incorporated, in the same amount, into another sample of the same paint as control.

The composition of the paint was:

| | |
|---|---|
| "Alloprene" R10 | 15 g |
| "Cereclor" 70 | 10 g |
| "Cereclor" 42 | 5 g |
| Alumina | 30 g |
| Xylene | 25 g |
| White Spirit | 6 g |

Alloprene R10 is a chlorinated rubber sold by ICI Limited. Cereclor 70 and 42 are chlorinated paraffins sold by ICI Limited.

Paints 2a (chromate exchanged alumina) and 2b (unexchanged alumina), were applied by brush to polished mild steel plates (15 cm × 10 cm size) at a thickness of 80 microns. When dry, each paint film was scored through to the metal with diagonal lines and each paint tested by immersing the plates in salt water for 384 hours and by placing the plates in a salt spray cabinet conforming to ASTM B117/73 for 360 hours.

After testing each paint film was assessed visually for corrosion using a scale from 1 (=little corrosion) to 5 (=severe corrosion). The results are shown in Table 1 below.

TABLE 1

| Paint | Salt water immersion | Salt spray |
|---|---|---|
| 2a | 1 | 1 |
| 2b | 2 | 2 |

It will be seen that the paint containing chromate anions had better corrosion inhibiting properties than the paint containing unexchanged alumina.

EXAMPLE 3

Chromate, phosphate, benzoate and unexchanged F1 aluminas prepared as described in Example 1 were prepared for incorporation into paints by grinding in distilled water in a porcelain ball mill for 60 hours and drying for 16 hours at 100° C. under vacuum The maximum particle size was 10 μm. The ground particles were incorporated into paints by ball milling for 16 hours. The composition of the paints was:

| | |
|---|---|
| "Synolac 76W" | 30 g |
| 36% Lead Octoate | 0.25 g |
| 12% Cobalt Octoate | 0.75 g |
| "Nuodex Exkin" 2 | 0.15 g |
| Soya Lecithin | 0.04 g |
| Alumina (each of samples a to d) | 21.1 g |
| "Microdol" Extra | 7.2 g |
| White Spirit | 5.0 g |

Synolac 76W is a long-oil alkyd solution in white spirit sold by Cray Valley Products Ltd. The lead and cobalt octoates are driers sold by Manchem Ltd. Nuodex Exkin 2 is an anti-skinning agent sold by Durham Raw Materials Ltd. Soya Lecithin is a pigment dispersant sold by BOCM Silcock. Microdol Extra is a micronised talc sold by A/S Norwegian Talc.

Paints 3a (chromate exchanged alumina), 3b (phosphate exchanged alumina), 3c (benzoate exchanged alumina) and 3d (unexchanged alumina), were brush-applied to polished mild steel plates (15 cm × 10 cm size) at a thickness of approximately 35 μm. The plates were allowed to dry for one week at room temperature before testing by placing the plate in a salt spray cabinet (conforming to ASTM B117-73) for 336 hours.

After testing each plate was assessed visually for corrosion as in example 2. The results are shown in Table 2 below:

TABLE 2

| Paint | Salt Spray |
|---|---|
| 3a | 1 |
| 3b | 1 |
| 3c | 2 |
| 3d | 5 |

It will be seen that the paints containing ion exchanged alumina had better corrosion inhibiting properties than the paints containing unexchanged alumina.

I claim:

1. A corrosion inhibitor consisting of particles of up to 100 microns diameter of an inorganic oxide having corrosion-inhibiting anions selected from the group consisting of phosphate, chromate or benzoate chemically bound to the particles by ion exchange, whereby said anions bound to said particles can only be released by further ion exchange.

2. A corrosion inhibitor as claimed in claim 1 whereby the inorganic oxide is alumina.

3. A corrosion inhibitor as claimed in claim 1 wherein the particles contain from 1 to 5% by weight of said corrosion inhibiting anions.

4. A method of forming corrosion inhibiting particles as claimed in claim 1 characterized in that an inorganic oxide containing hydroxyl group is contacted with an acidic solution containing phosphate, chromate or benzoate anions at ambient temperature.

5. A method as claimed in claim 4 wherein the pH of the acidic solution is from 2 to 5.

6. A protective coating containing corrosion-inhibiting particles as claimed in claim 1.

7. A protective coating as claimed in claim 6 which contains from 30 to 80% wt of particles based on the dry film weight.

8. A protective coating as claimed in claim 6 wherein the coating is based on epoxy resin, alkyd resin or chlorinated rubber.

* * * * *